Patented Jan. 12, 1937

2,067,747

UNITED STATES PATENT OFFICE 2,067,747

ELECTROLYTES FOR PLATING RHODIUM AND METHODS OF MAKING THE SAME

Fritz Zimmermann, Newark, N. J., assignor to Baker & Co., Inc., Newark, N. J., a corporation of New Jersey No Drawing. Application September 19, 1931, Serial No. 563,887

10 Claims. (Cl. 204—1)

This invention relates to the method of preparing soluble rhodium salts and the products thereof.

One object of my invention is the provision of a method of rendering an insoluble rhodium salt soluble.

Another object of my invention is the provision of new compounds prepared from an insoluble rhodium salt.

A further object is the provision of an electrolyte containing new rhodium compounds.

Other objects and advantages of my invention will be in part obvious and in part specifically pointed out in the description hereinafter contained, which discloses several embodiments of my invention, it being expressly understood, however, that various changes may be made in practice within the scope of the appended claims without digressing from my inventive idea.

I have found that if rhodium ammonium nitrite is suspended in water, and the mixture is heated, that a soluble salt is obtained in solution. Rhodium ammonium nitrite, as described in the literature, has a formula $(NH_4)_3Rh(NO_2)_6$. However, I believe that the actual composition of this insoluble salt is close to $Na(NH_4)_2Rh(NO_2)_6$. This rhodium ammonium nitrite salt is very insoluble and is used for quantitative precipitation of rhodium, and for separating rhodium from other metals. I have found that if I boil this salt in water for a certain length of time it will go in solution and stay in solution, and by adding more salt into the aqueous solution I can get larger and larger quantities in solution and make them stay in solution.

One method of working my invention is as follows. Take 25 grams of rhodium ammonium nitrite and suspend the same in 100 cc. of distilled water. The mixture is then heated under a reflux condenser and all the 25 grams of salt will go into solution. The mixture is boiled for about 10 to 30 hours, and during this time solution takes place, and the resulting solution has an acid reaction. During the act of dissolving, brown fumes are given off, indicating that a partial decomposition takes place and that some of the nitrogen and oxygen are released from the molecule. I believe that these brown fumes are $NO_2$. The reflux condenser is used in order to prevent the solution from evaporating to dryness. It is open to the atmosphere to permit the escape of any gaseous products. The boiling and dissolving steps are carried on in the presence of these brown fumes, which may form acids with the water present and hasten the solution of the rhodium ammonium nitrite in the water. The heating may be performed in an open vessel, but the heating must be prolonged when the reflux condenser is not used.

The solution obtained from boiling the rhodium ammonium nitrite with water is transferred into a volumetric flask and filled up to 250 cc. Samples of 10 cc. each of this solution correspond to 1 gram of original rhodium ammonium nitrite. By evaporating one of these samples to dryness, until constant weight is obtained, I find that the dry product weighs about 785 milligrams. From this it will be apparent that starting with 1 gram of the insoluble salt I now have left 78½% of the original weight, and the difference, therefore, must have escaped as gaseous products. Toward the end of the evaporating step a gelatinous product is obtained. Further evaporation is necessary to obtain the dry product. The dry product is very hygroscopic and tends to go back to the gelatinous form when allowed to stand in the air. This tends to show that the salt in the dry form and the solution contain different amounts of water in combination since the dry salt has such a great affinity for water. The dry product is easily soluble in 1 cc. of water. It will be seen, therefore, that I have changed a material which was practically insoluble in water, into one of extreme solubility, since 100 grams are easily soluble in 100 cc. of water. I believe that this dry product is different from the product which exists in the water solution, but I have not been able to isolate the compound which is apparently stable only in solution.

One sample corresponding to 1 gram of original salt which had been dissolved in water by boiling under a reflux condenser and evaporated in a porcelain crucible was easily soluble in water. When the solution was brought up to 100 cc. it showed a pH of 2.6. Another sample made in a similar way showed a pH of 3.4, and still another sample gave a pH of about 3.8.

The soluble material contained in the water solution is an electrolyte, and on passing an electric current through the same, yields a deposit of rhodium.

When using this electrolyte as a bath a voltage of about 6 volts with ½ ampere is used. The effective anode and cathode surfaces are about 6 square inches, and the distance between the two electrodes is about 1½ inches. About 2 grams of rhodium per liter are used.

A solution of 500 cc. prepared in the manner described is made slightly ammoniacal. This ammoniacal solution is plated with a current density of about 10 amperes per square foot at 4 volts at a temperature of about 30 to 60° C. A good solution is obtained. Furthermore, my acid rhodium salt in solution may be neutralized and a neutral electrolyte obtained.

The electrolytes above described are especially adapted for tarnish proofing the cheaper metals which tarnish when exposed to atmospheric conditions. When rhodium is deposited out of my electrolytes on articles, a silver white deposit is obtained.

Other insoluble alkali rhodium salts, such as, rhodium potassium nitrite, also go into solution when treated in a way similar to the ones described in connection with rhodium ammonium nitrite, and my invention is, therefore, not to be restricted to the latter salt.

While the soluble rhodium compounds in solution form an electrolyte which may be used for the deposition of rhodium, it is expressly understood that any usual conducting salts, such as sodium sulphate, ammonium nitrate, ammonium sulphate, or the like, may be added. Conducting salts may also be added to the neutral and ammoniacal electrolytes above described without departing from the spirit of my invention. It is also to be expressly understood that other bases may be used instead of ammonia in making the basic or neutral electrolytes.

While I have given a method of preparing my soluble rhodium compounds from the insoluble rhodium ammonium nitrites, it is to be expressly understood that this method is given as an example of a method of carrying out my invention, but I am not to be restricted to this method, since it may be varied without departing from my inventive idea.

During the boiling operation, under the reflux condenser, gases escape and brown fumes are given off. I believe that during the boiling operation the rhodium ammonium nitrite is partially decomposed and some of the $NO_2$ groups are released from the molecule. I believe that the resulting soluble compounds contain ammonium groups and nitrite groups, but in different proportions than in the insoluble rhodium ammonium nitrites, and I, therefore, believe that I have discovered a new water soluble product which I call the aqua-salt of rhodium, and which may also be termed a water soluble rhodium ammonium nitrite. The compound is apparently stable in water solution, but I have not been able to isolate the compound, and hence have been unable to analyze the same in order to obtain the formula thereof. By isolating the compound I mean a well crystallized material to which I could give a definite chemical formula. The amorphous evaporated product which is of a hygroscopic product can be easily obtained by evaporation as hereinbefore stated.

The method of producing my new rhodium compounds and solutions thereof, and of using such solutions in electroplating, is given only as an example of an embodiment of my invention, but it is to be expressly understood that this method may be varied without digressing from my invention.

What I claim is:
1. An electrolyte adapted for electrodepositing rhodium, which contains an alkali metal rhodium nitrite compound, the amount of nitrogen in the compound being less than the amount of nitrogen in an alkali metal rhodium nitrite.

2. An electrolyte adapted for electrodepositing rhodium, which contains a water soluble ammonium rhodium nitrite compound, the amount of nitrogen in the compound being less than the amount of nitrogen in ammonium rhodium nitrite or ammonium sodium rhodium nitrite.

3. An alkaline electrolyte obtained by dissolving in ammonia an ammonium rhodium nitrite compound, the amount of nitrogen in the compound being less than the amount of nitrogen in ammonium rhodium nitrite or ammonium sodium rhodium nitrite.

4. An electrolyte containing an alkaline solution of an ammonium rhodium nitrite compound, the amount of nitrogen in the compound being less than the amount of nitrogen in ammonium rhodium nitrite or ammonium sodium rhodium nitrite.

5. A method of making an electrolyte for electro-depositing rhodium, which includes boiling ammonium rhodium nitrite or ammonium sodium rhodium nitrite in a liquid menstruum consisting essentially of water until a clear solution is obtained and then adding a sufficient amount of ammonia to render the electrolyte slightly ammoniacal.

6. A method of making an electrolyte for electrodepositing rhodium which includes boiling ammonium rhodium nitrite or ammonium sodium rhodium nitrite in a liquid menstruum consisting essentially of water until a clear solution is obtained and then adding a sufficient amount of an alkali to render the electrolyte alkaline.

7. A method of making an electrolyte for electrodepositing rhodium which includes decomposing an insoluble alkali metal rhodium nitrite compound with the liberation of one or more nitrite groups by boiling the compound in a liquid menstruum consisting essentially of water until a clear solution is obtained, and then adding ammonia to render the electrolyte slightly alkaline.

8. A method of making an electrolyte for electrodepositing rhodium which includes decomposing an insoluble alkali metal rhodium nitrite compound with the liberation of one or more nitrite groups by boiling the compound in a liquid menstruum consisting essentially of water until a clear solution is obtained and then adding a sufficient amount of an alkali to produce an alkaline electrolyte.

9. An electrolyte adapted for electrodepositing rhodium and containing an alkaline solution of an ammonium rhodium nitrite compound, the amount in the nitrite compound of $NO_2$ in proportion to the rhodium being less than the $NO_2$ content of ammonium rhodium nitrite.

10. An electrolyte for electrodepositing rhodium which contains a partially decomposed, normally water-insoluble alkali metal rhodium nitrite compound.

FRITZ ZIMMERMANN.